United States Patent [19]
Shinada

[11] Patent Number: 4,802,025
[45] Date of Patent: Jan. 31, 1989

[54] VIDEO SIGNAL CIRCUIT HAVING TIME BASE CORRECTION

[75] Inventor: Toru Shinada, Kaisei, Japan

[73] Assignee: Fuji Photo Film Co., Ltd., Kanagawa, Japan

[21] Appl. No.: 929,509

[22] Filed: Nov. 12, 1986

[30] Foreign Application Priority Data

Nov. 12, 1985 [JP]  Japan .................................. 60-252012

[51] Int. Cl.[4] ............................................. H04M 5/95
[52] U.S. Cl. .................................. 360/36.2; 360/36.1; 358/339; 358/337; 358/320
[58] Field of Search ..................... 360/36.2, 36.1, 33.1, 360/37.1; 358/339, 337, 335, 320, 325; 365/230, 233, 239

[56] References Cited

U.S. PATENT DOCUMENTS

| | | | |
|---|---|---|---|
| 3,919,716 | 11/1975 | Yumde | 360/9.1 |
| 3,971,063 | 7/1976 | Micheal | 358/320 |
| 4,018,990 | 4/1977 | Long | 360/36.2 |
| 4,138,694 | 2/1979 | Doi | 360/36.2 |
| 4,614,979 | 9/1986 | Sugiyama | 360/37.1 |
| 4,649,511 | 3/1987 | Gdula | 365/233 |

Primary Examiner—Alan Faber
Attorney, Agent, or Firm—Birch, Stewart, Kolasch & Birch

[57] ABSTRACT

A video signal circuit performing the function of time base correction has a pair of memories each adapted to store at least one field of video data and a pair of shift registers associated with both memories. The memories are set to the read state and write state alternately. A shift register associated with a memory in its write state receives one unit of video signal data in series in response to a first sync signal to write these data in the associated memory during a portion of the horizontal blanking period specified by the first sync signal. The other shift register associated with the memory in its read state reads another unit of video signal data from the associated memory during a portion of the horizontal blanking period specified by a second sync signal to sequentially produce the read data in synchronism with the second sync signal.

10 Claims, 5 Drawing Sheets

VIDEO SIGNAL CIRCUIT HAVING TIME BASE CORRECTION

BACKGROUND OF THE INVENTION

1. Field of the Invention

This invention relates to a video signal circuit and more particularly to a video signal circuit having the function of time base correction of video signals.

2. Description of the Prior Art

When video signals recorded on video signal recording media such as video floppy disks or video tapes are reproduced by a reproducing device, so-called jitters or instability along the time axis may be occasionally contained in the reproduced signals usually due to unstable factors peculiar to the recording or reproducing device. When video signals containing jitters are displayed on a video monitor, only unstable images hard to view will be reproduced.

There is also a demand for devices adapted for reproducing an image recorded on a video signal recording medium in the form of a hard copy, that is, for recording it in the form of a visible image on another recording medium such as a sheet of photographic paper. When such a recording device is supplied with video signals containing jitters as video signals to be visualized, it is not possible to produce stable and clear hard copies.

So far, a time base corrector has been used for establishing proper stability in video signals unstable along the time axis, i.e. containing jitters of sync signals. According to a known system of such a time axis corrector, there is provided a video memory for storing video signal data and a sophisticated and complex control is carried out in order to improve stability in time axis, as by controlling read and write timing of video data to the video memory or switching read and write addresses of the memory at the rate of pixel clocks.

On the other hand, large scale integrated circuits (LSI's) have evolved for application of computer terminal devices, which includes on a semiconductor chip a shift register enabling data to be written into and read out of a conventional IC, which is also formed on the chip, serially at a high speed, utilizing the nature of video data signals.

SUMMARY OF THE INVENTION

It is therefore a principal object of the present invention to provide an image signal circuit having a function of correcting the time base of image signals to thereby produce time-axis stabilized image signals.

The video signal circuit having time base correction has a pair of storage means each for storing at least one-field video signal data, a pair of shift register means associated with said storage means for temporarily storing a unit of video signal data, and control means for producing first sync signals timed with input signal data and second sync signals timed with reference clocks, for setting one of the pair of storage means to a write state and the other of said pair of storage means to a read state, and for alternately switching the states in a period of time in which the video signal data are neither written in nor read out from said storage means. The control means supplies a first sync signal to one of said shift register means associated with one of said storage means that is in the write state and a second sync signal to one of said shift register means associated with one of said storage means that is in the read state. One of said shift register means associated with one of said storage means that is in the write state receives a unit of video signal data in series in response to the first sync signal to write the unit of video signal data in a horizontal blanking period determined by the first sync signal. One of said shift register means associated with one of said storage means in the read state reads a unit of video signal data from the associated storage means to sequentially produce the readout data in synchronism with the second sync signal.

BRIEF DESCRIPTION OF THE DRAWINGS

The objects and features of the present invention will become more apparent from consideration of the following detailed description taken in conjunction with the accompanying drawings in which.

DESCRIPTION OF A PREFERRED EMBODIMENT

A preferred embodiment of the video signal circuit having the function of time base correction according to the present invention is hereafter explained by referring to the accompanying drawings.

Figure 2:
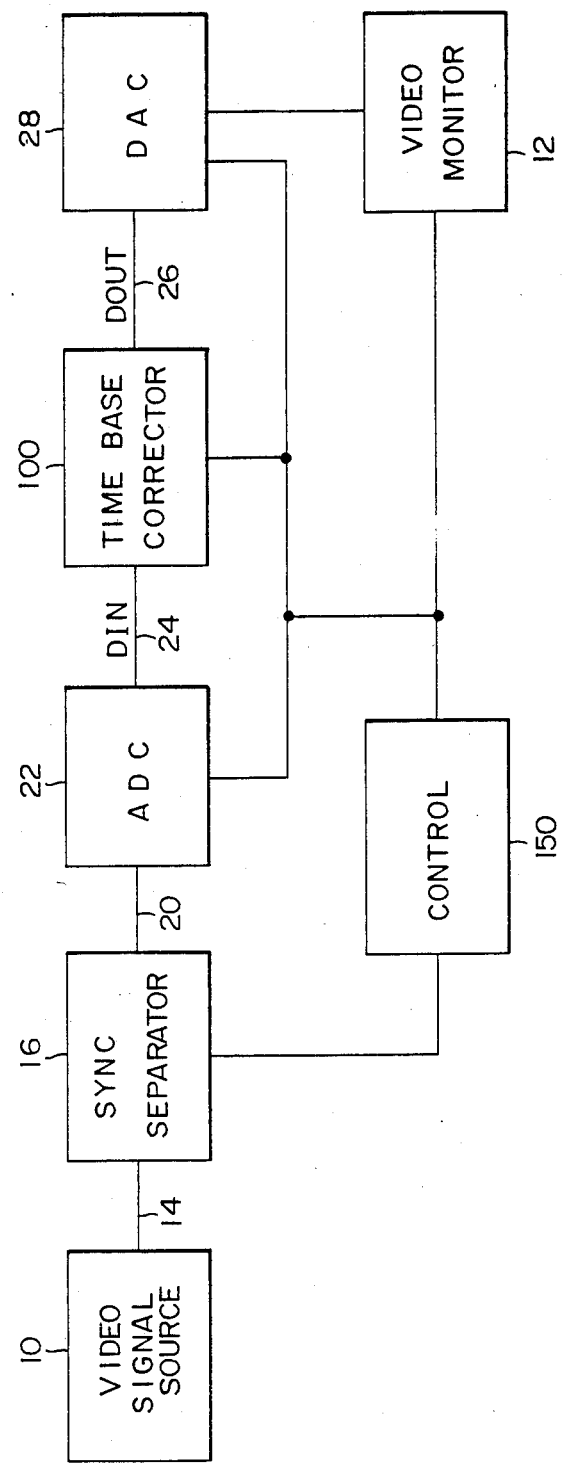
FIG. 2 is a schematic block diagram showing an embodiment of the image signal circuit in accordance with the present invention.

Referring to FIG. 2, there is shown an embodiment of the present invention in which video signals are applied to a monitor. The embodiment includes a video signal source 10 as means for reproducing video signals recorded on a video signal recording medium such as video floppy disk or video tape. The video signals developed from the signal source 10 are ultimately reproduced in the form of a visible image on a video monitor 12 including such as, for example, a cathode ray tube (CRT). Due to the properties of the video signal recording medium, jitters may be contained in the video signals supplied from an output 14 of the video signal source 10. A video recording device for recording the image of the video signals as a hard copy may be connected to the circuit in place of or in addition to the video signal monitor 12.

The video signals produced from the output 14 are supplied to a sync separator 16 where the sync signals contained in the video signals are separated and supplied to a control circuit 150. The video signals supplied from an output 20 of the sync separator 16 are analog signals that are in turn fed to an analog to digital converter (ADC) 22 where they are converted to video signal data in the form of digital signals. These video signal data are supplied to the input of a time base corrector 100.

As will be described in detail by referring to FIG. 1, the time base corrector 100 is a functional unit which stores video signal data DIN provided at an input 24 in a timed relation with pixel clocks produced responsive to horizontal sync signals separated by sync separator 16, and then produces the data during an effective horizontal scanning period at an output 26 at a pixel clock rate synchronized with stable reference clocks so as to stabilize the output rate of video signal data DOUT at the output 26.

The output video signal data DOUT are fed to a digital to analog converter DAC 28 where they are converted into corresponding analog signals so as to be supplied to the video signal monitor 12 at a television signal rate.

Those components of the circuitry are controlled by a control circuit 150. As will be described in detail by referring to FIG. 3, the control circuit 150 is a functional unit which produces a variety of timing signals including sync signals, in response to the sync signals separated from the sync separator 16 and to its own self-running reference clock source 152, to thereby enable the time base corrector 100 so as to process the video signals from the video signal source 10 to form a stable image on the video monitor 12.

Figure 1:
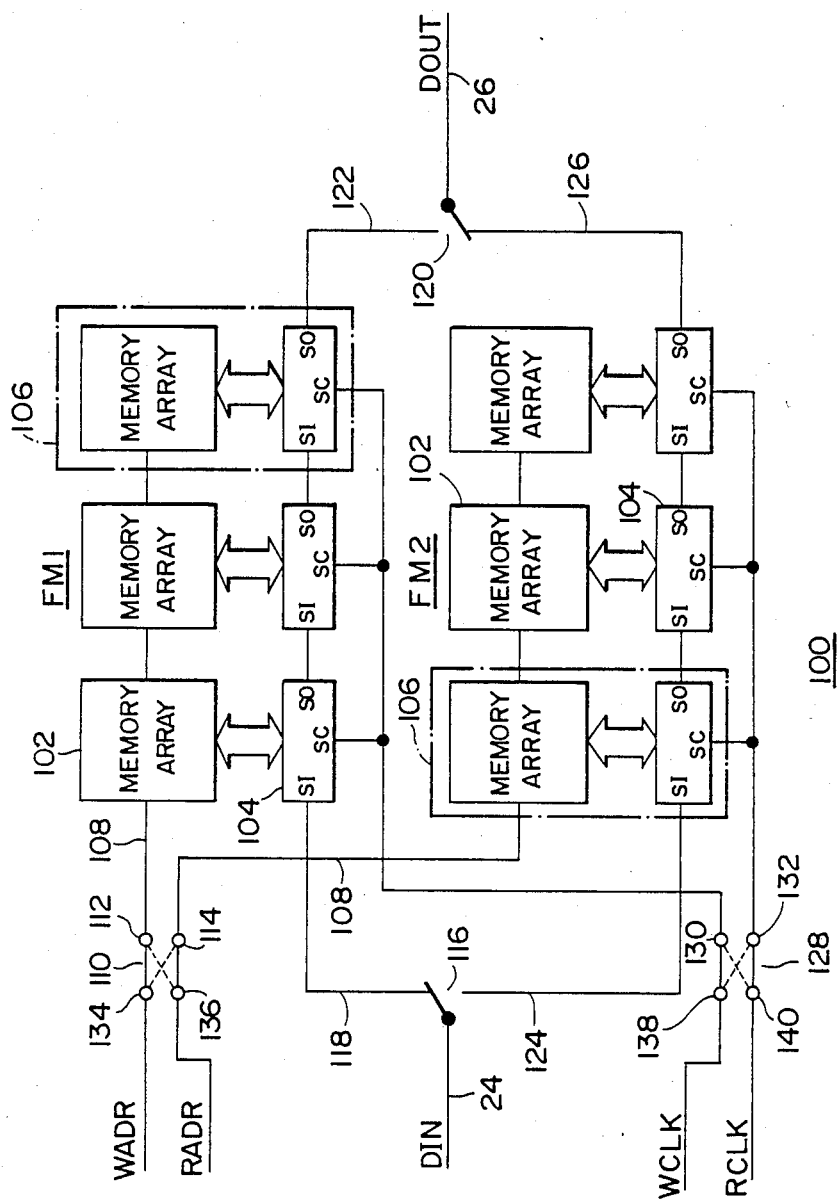
FIG. 1 is a schematic block diagram showing an example of a time base corrector used in an image signal circuit shown in FIG. 2.

Referring to FIG. 1, the time base corrector 100 in the present embodiment has six sets of memory arrays 102 and shift registers 104. Each set of the memory array 102 and the shift register 104 may advantageously be a large-scale integrated circuit LSI 106 comprised of a memory array and a shift register mounted on a common semiconductor chip, such as Model TMS4161, Dual-Port 64K DRAM or VRAM, manufactured and sold by Texas Instruments Inc. Data may be written in and read out in parallel between the memory array 102 and the shift register 104 of each set.

In the present embodiment, the upper three integrated-circuit units 106 in FIG. 1 make up a field memory #1 or FM1 for the video signal data while the lower three integrated-circuit units 106 make up a field memory #2 or FM2 for the video signal data. These field memories #1 and #2 constitute a paired video signal data storage. In the field memory #1, an address line 108 is connected in tandem through the memory arrays 102 and is ultimately connected to one output terminal 112 of a switching circuit 110. Similarly, in the field memory #2, another address line 108 is connected in tandem through the memory arrays 102 and is finally connected to the other output terminal 114 of the switching circuit 110.

In the field memory #1, a data output SO and a data input SI of each shift register 104 are connected to each other in tandem and the data input SI of the first stage is connected to a terminal 118 of a switch 116, while the data output SO of the third stage is connected to a terminal 122 of a switch 120. Similarly, in the field memory #2, the data output SO and the data input SI of each shift register 104 are connected to each other in tandem and the data input SI of the first stage is connected to the other terminal 124 of the switch 116, while the data output SO of the third stage is connected to the other terminal 126 of the switch 120.

Also, in the field memory #1, clock terminals SC of the shift registers 104 are connected by a common connection line to the output terminal 130 of the switching circuit 128 while, in the field memory #2, clock terminals SC of the shift registers 104 are connected by a common connection line to the other output terminal 132 of the switching circuit 128.

By this construction, field video signal data comprised of 256 horizontal scanning lines with 768 pixels per line may be stored in each of the field memories FM1 and FM2.

The switches 116 and 120 are adapted for selectively assuming one connecting position shown in FIG. 1 and the other connecting position opposite thereto under the control of the control circuit 150. The input terminal of the switch 116 is connected to an output 24 of the analog to digital converter 22 while the output terminal of the switch 120 is connected to an input 26 of the digital to analog converter 28.

The switching circuit 110 is adapted for selectively assuming one connecting position shown by the solid line and the other position shown by the broken line in FIG. 1 under the control of the control circuit 150. A write address WADR and a read address RADR are supplied from the control circuit 150 to one input terminal 134 and the other input terminal 136 of the switching circuit 110, respectively.

Similarly, the switching circuit 128 is adapted for selectively assuming the solid-line connecting position and the broken-line connecting position in FIG. 1 under the control of the control circuit 150. A write clock WCLK and a read clock RCLK are supplied from the control circuit 150 to one input terminal 138 and the other input terminal 140 of the switching circuit 128, respectively.

When the switching circuits 110, 128 and the switches 116, 120 are in the solid-line connecting positions in FIG. 1, the field memories #1 and #2 are in the write and read states, respectively. When those switching circuits and switches are in the opposite positions, the field memories #1 and #2 are in the read and write states, respectively.

Figure 3:
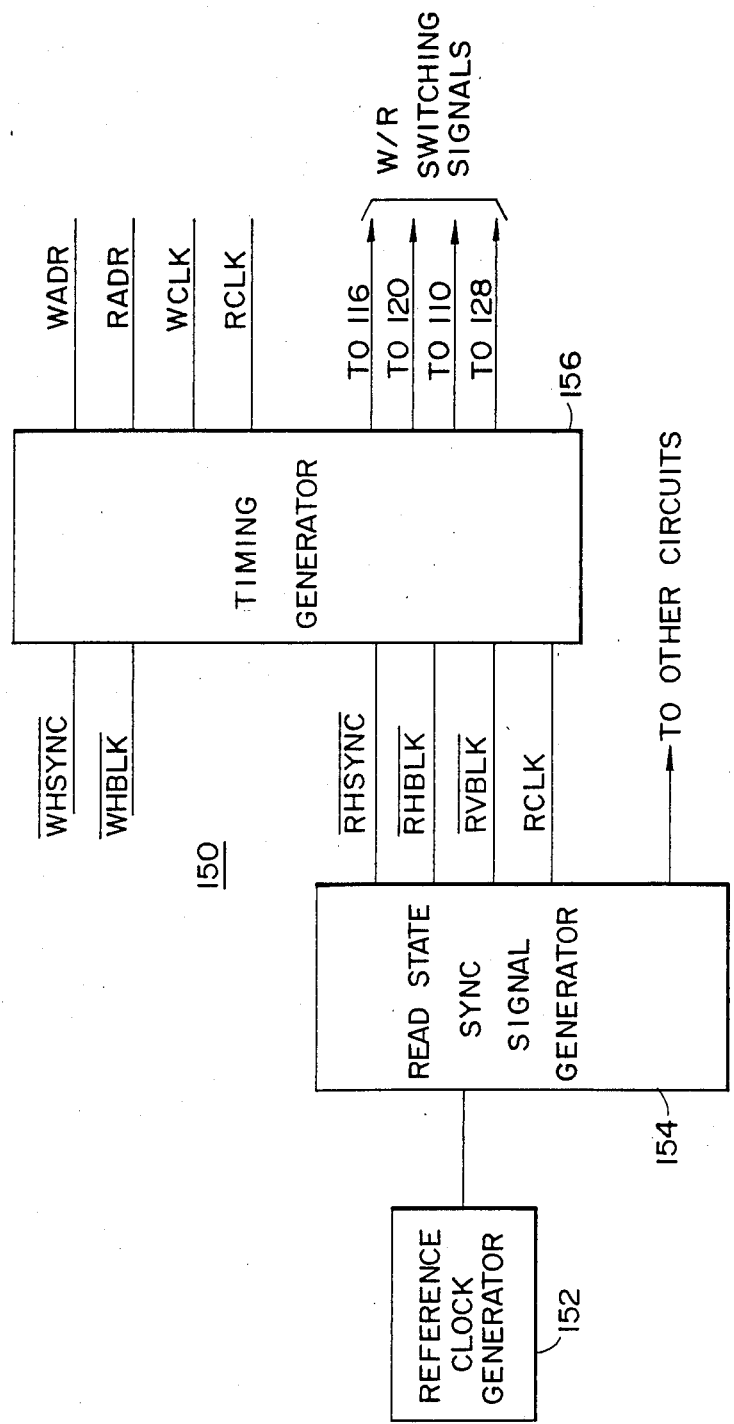
FIG. 3 is a schematic block diagram showing an example of a control circuit involved in the circuit shown in FIG. 2.

The timing and control signals supplied to various parts of the time base corrector 100 are generated by the control circuit 150, details of which will be described with reference to FIG. 3. The control circuit 150 has a reference clock source 152 adapted to produce reference clocks at a stable frequency that are in turn supplied to a read-state sync signal generator 154.

The reference clocks are divided in frequency by the read-state sync signal generator 154 to produce various sync signals necessary for processing the video signals. These sync signals are supplied to the circuits in the apparatus while read horizontal sync signal $\overline{\text{RHSYNC}}$, read horizontal blanking signal $\overline{\text{RHBLK}}$ read vertical blanking signal $\overline{\text{RVBLK}}$ and read clock signal $\overline{\text{RCLK}}$ are supplied to a timing generator 156.

The timing generator 156 receives these read sync signals as well as write horizontal blanking signals $\overline{\text{WHBLK}}$ and write horizontal sync signals $\overline{\text{WHSYNC}}$ contained in the write sync signals received from the sync separator 16 for producing various timing signals on the basis of these signals.

The timing generator 156 generates write addresses WADR and read addresses RADR specifying the write storage and read storage locations in the field memories #1 or #2, respectively.

In the above embodiment, two field memories #1 and #2 are used. However, each two of these field memories #1 and #2 may be connected in tandem, or alternatively, memories which have larger capacity may be used as frame memories. Such arrangement is effective for converting the scanning scheme from input video signal data DIN to output video signal data DOUT, for example. More specifically, when the interlace and non-interlace scanning systems are adopted for the write and read sides of time-base corrector 100, respectively, every other address or continuous addresses may be designated at either the write side or read side in the production of the write addresses WADR and the read addresses RADR.

The timing generator 156 also generates write clocks WCLK for driving the shift registers 104 of the field memories #1 or #2 at the pixel clock frequency of the input video signals DIN during writing and read clocks RCLK supplied from read-state sync signal generator 154. The timing generator 156 also generates W/R switching signals for switching the connecting states of the switches 116, 120 and the switching circuits 110.

These signals are generated on the basis of the sync signals supplied from the sync separator 16 insofar as the writing of the video signal data DIN into the field memories #1 or #2 is concerned, and on the basis of the sync signals supplied from the sync signal generator 154, insofar as the reading of the video signal data DOUT from the field memories #1 or #2 is concerned.

Figure 4:
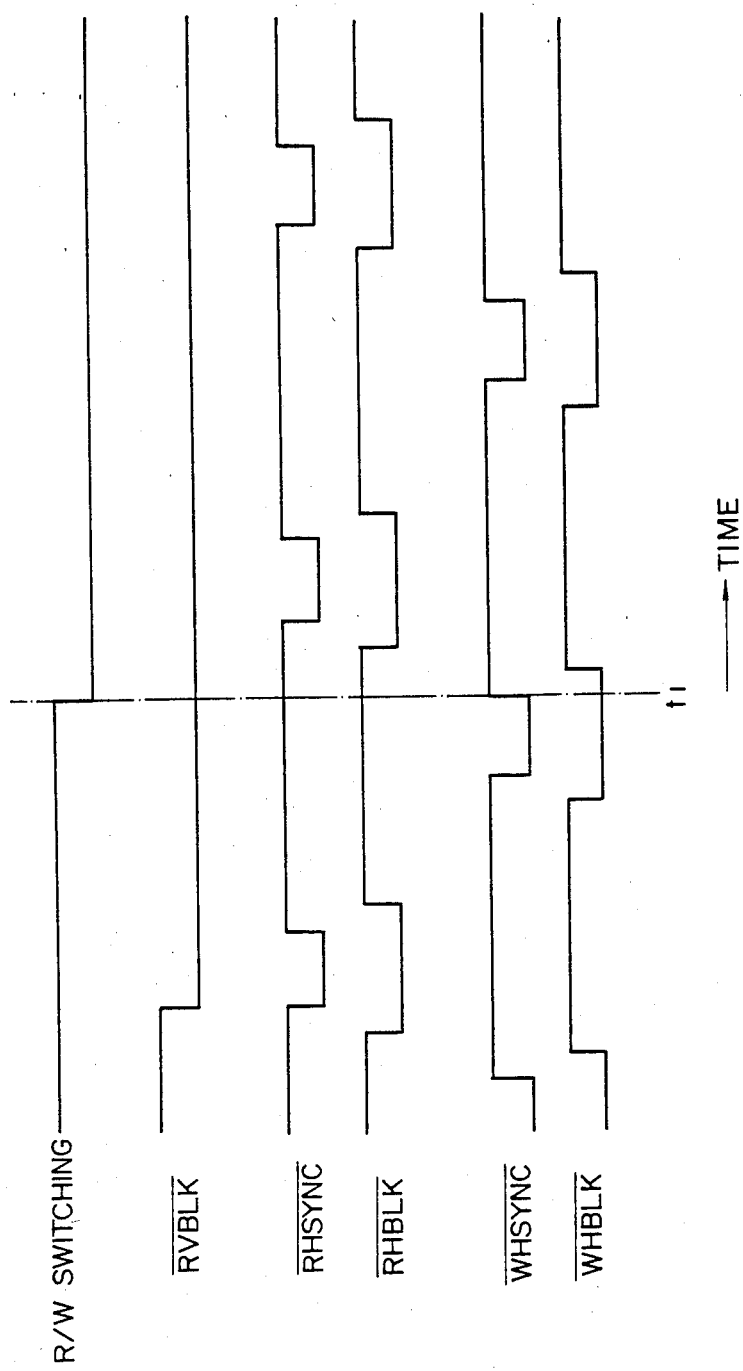
FIGS. 4 and 5 show signal waveforms appearing in the portions of the circuit shown in FIGS. 1 and 3.

Writing into and reading from the field memories #1 and #2 are performed alternately. More specifically, when the input video data DIN are being written into one of these memories, the video signals data are read from the other field memory, and vice versa, this state being switched alternately. According to the present embodiment, this switching between the writing and reading is timed with the positive-going edge of the write-state horizontal sync signal WHSYNC during the read-state blanking period or during the time that the vertical blanking signal $\overline{\text{RVBLK}}$ is kept in its low level, in other words, at a time t1 within the horizontal blanking period after the horizontal scanning period is terminated and the shift register data are written into the memory cells as shown in FIG. 4.

It is assumed for example that the switching circuits 110 and 128 are in the connecting state shown by the solid lines in FIG. 1, while the switches 116 and 120 are in the connecting state shown in FIG. 1, write addresses WADR are supplied to the memory arrays 102 of the field memory #1 from the output terminal 112 of the switching circuit 110, while the first stage input SI of the associated shift registers 104 is connected to the input terminal 24. Similarly, read addresses RADR are supplied to the memory arrays 102 of the field memory #2 from the output terminal 114 of the switching circuit 110, while the last stage output SO of the associated shift registers 104 is connected to the output terminal 26. Concurrently, write clocks WCLK are supplied to the clock terminals SC of the shift registers 104 of the field memory #1 from the output 130 of the switching circuit 128, while read clocks RCLK are supplied to the clock terminals SC of the shift registers 104 of the field memory #2 from the output 132 of the switching circuit 128.

Figure 5:
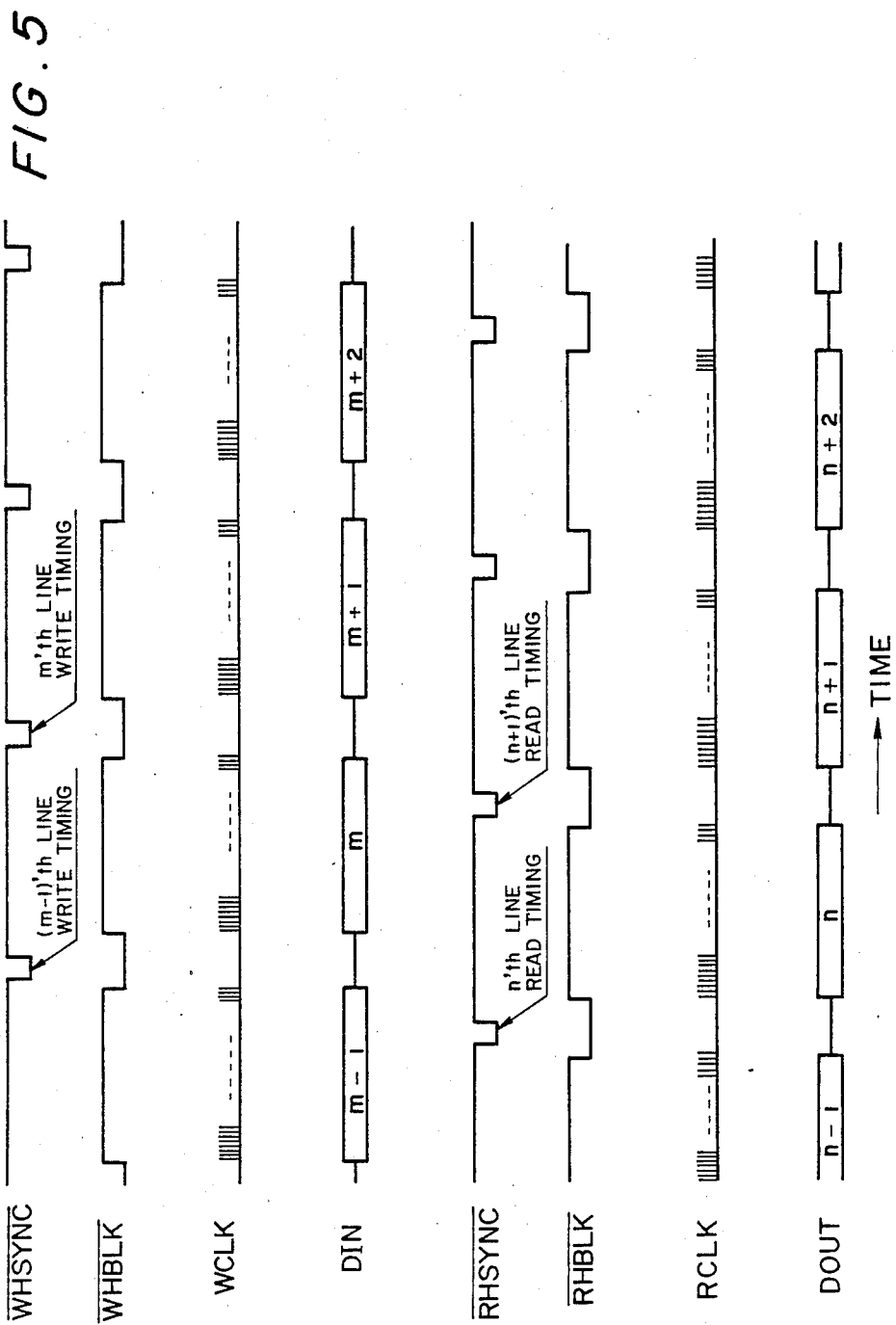

In this manner, the input video signal data DIN are written into the field memory #1 while stored video signal data are read from the field memory #2. The operational timing is shown in FIG. 5.

In the field memory #1, the shift registers 104 are incremented during an effective horizontal scanning period of the input video signal data DIN in response to the write clocks WCLK received from the output terminal 130 of the switching circuit 128 such that the input video signal data DIN are sequentially introduced through the switch 116. The input video signal data stored in the shift registers 104 for one horizontal scanning line are written in the storage locations of the memory arrays 102 designated by the write addresses WADR supplied from the output terminal 112 of the switching circuit 110.

In the field memory #2, during those operations, the output video signal data DOUT for one horizontal scanning line are read in parallel in a horizontal blanking period determined by sync signals produced by the sync signals generator 154. These signal data are read into the shift registers from the memory locations of the respective memory arrays 102 specified by the read addresses RADR supplied from the output terminal 114 of the switching circuit 110. The shift registers 104 are incremented during an effective scanning period determined by the sync signals generated by the sync signal generator 154 and are responsive to read clocks RCLK from the output terminal 132 of the switching circuit 128 such that the output video signal data DOUT are sequentially transmitted through the switch 120 to the output 26.

In this manner, writing of the video signal data DIN into field memory #1 and reading of the video signal data which are from the field memory #2 proceed sequentially for each horizontal scanning period. During a read-state vertical blanking period determined by the sync signals generated by the sync signal generator 154, after the end of the horizontal scanning period, after the data is written into the memory arrays 102, that is, at the time of positive-going edge t1 of the input-state horizontal sync signal $\overline{\text{WHSYNC}}$, the timing signal generator 156 generates a W/R switching signal, whereby the write and read states are switched for the field memories #1 and #2. The switching circuits 110 and 128 are responsive thereto to be set to the connecting state shown by the broken line in FIG. 1 so that the connecting states of the switches 116, 120 are reversed from those shown in the figure.

The read addresses RADR are supplied at this time to the memory arrays 102 of the field memory #1 from the output terminal 112 of the switching circuit 110 and the last stage output SO of the associated shift register 104 is connected to the output terminal 26. Similarly, the write address WADR is supplied to the memory arrays 102 of the field memory #2 from the output terminal 114 of the switching circuit 110 while the first stage input SI of the shift registers 104 is connected to the input terminal 24. Concurrently, the read clocks RCLK are supplied to the clock terminals SC of the shift registers 104 of the field memory #1 from the output 130 of the switching circuit 128, while the write clocks WCLK are supplied to the clock terminals SC of the shift registers 104 of the field memory #2 from the clock terminals SC of the shift registers 104.

In this manner, the input video signal data DIN are written into the field memory #2, while the video signal data DOUT are read from the field memory #1. This operation is repeated alternately and sequentially so that the video signal data DOUT stable along the time axis or free from jitters are produced from the time base corrector 100.

From the foregoing, it has been seen that the arrangement of the present invention makes it possible to produce video signals stable along time axis even when the video signals possibly containing jitters along time axis are received. By using an integrated circuit including video memory arrays and associated read and write shift registers formed on a single semiconductor chip, a time base corrector may be obtained which is improved in compatibility with the logic of a processing system adapted for a control circuit for controlling the integrated circuit. In this manner, a video signal circuit is provided which has the function of time base correction and is thereby able to develop video signals free from jitters along the time axis.

While the present invention has been described with reference to the particular illustrative embodiment, it is not to be restricted by the embodiment but only by the appended claims. It is to be appreciated that those skilled in the art can change or modify the embodiments without departing from the scope and spirit of the present invention.

What is claimed is:

1. A video signal circuit having time base correction comprising:
    a pair of storage means each for storing at least one field of video signal data;
    a pair of shift register means associated with said storage means for temporarily storing a unit of video signal data; and
    control means for producing a first sync signal synchronized with input video signal data and a second sync signal synchronized with a reference clock for setting one of said pair of storage means to a write state and the other of said pair of storage means to a read state, and for alternately switching the states during a period of time in which the video signal data are neither written in nor read out from said pair of storage means;
    said control means supplying the first sync signal to the shift register means associated with the storage means that is in the write state and the second sync signal to the storage means that is in the read state;
    the shift register means associated with the storage means that is in the write state receiving a unit of input video signal data in series in response to the first sync signal to write the unit of input video signal data into said storage means associated therewith in a horizontal blanking period determined by the first sync signal;
    the shift register means associated with the storage means in the read state reading a unit of video signal data from the associated storage means to sequentially produce a readout unit of video signal data in synchronism with the second sync signal;
    said pair of shift register means producing the readout unit of video signal data and receiving the input unit of video signal data at rates that are equal to each other.

2. A circuit according to claim 1 wherein each of said pair of storage means and one of said shift register means which is associated therewith are mounted to form a unit of integrated circuitry.

3. A circuit according to claim 1 wherein said control means further comprises oscillator means for generating the reference clock at a stable frequency.

4. A circuit according to claim 3 further comprising:
    signal receiving means for receiving a video signal in the form of an analog signal containing a sync signal and separating the sync signal from the video signal; and
    first signal converter means interconnected to said signal receiving means for converting said received video signal into said video signal data.

5. A circuit according to claim 4, wherein said control means further comprises:
    signal producing means operative in response to said signal receiving means and oscillator means for producing the first and second sync signals and producing an address signal for addressing a storage location of said pair of storage means;
    first switching means operative in response to a first switching signal from said control means for selectively supplying either one of said pair of shift register means with the video signal data produced from said signal converter means;
    second switching means operative in response to a second switching signal from said control means for selectively conveying the video signal data from either one of said pair of shift register means; and
    third switching means operative in response to a third switching signal from said control means for selectively supplying said pair of storage means with said address signal such that either one of said pair of storage means is supplied with an address signal for writing the video signal data into said one storage means and the other of said pair of storage means is supplied with an address signal for reading the video signal data out of said other storage means.

6. A circuit according to claim 4 further comprising second signal converter means interconnected to said pair of shift register means for converting the video signal data produced from either one of said pair of shift register means into an analog video signal associated therewith.

7. A circuit according to claim 6 further comprising means interconnected to said second signal converter means for producing an image represented by the analog video signal.

8. A circuit according to claim 3 further comprising signal converter means interconnected to said pair of shift register means for receiving the video signal data produced from either one of said pair of shift register means to produce a video signal in the form of an analog signal associated therewith.

9. A circuit according to claim 8, wherein said signal receiving means and said signal converter means receive the respective video signal and video signal data at the rate of the field video signal.

10. A circuit according to claim 9, wherein said signal receiving means receives the video signal repeatedly, and said second signal converter means receives the video signal data repeatedly.

* * * * *